US012623492B2

(12) United States Patent (10) Patent No.: US 12,623,492 B2
Fujii et al. (45) Date of Patent: May 12, 2026

(54) HEAVY DUTY TIRE

(71) Applicant: Sumitomo Rubber Industries, Ltd., Kobe (JP)

(72) Inventors: Riho Fujii, Kobe (JP); Kae Ito, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 19/207,365

(22) Filed: May 14, 2025

(65) Prior Publication Data

US 2025/0367978 A1 Dec. 4, 2025

(30) Foreign Application Priority Data

Jun. 3, 2024 (JP) ................................. 2024-089683

(51) Int. Cl.
B60C 9/20 (2006.01)
B60C 9/18 (2006.01)
(Continued)

(52) U.S. Cl.
CPC .......... B60C 9/2204 (2013.01); B60C 9/1835 (2013.01); B60C 11/0008 (2013.01); B60C 11/005 (2013.01); *B60C 2009/1857* (2013.01); *B60C 2011/0033* (2013.01); *B60C 2011/0341* (2013.01); *B60C 2200/06* (2013.01)

(58) Field of Classification Search
CPC ... B60C 11/00; B60C 11/005; B60C 11/0083; B60C 2011/0033; B60C 9/00; B60C 9/20; B60C 9/1835; B60C 9/2204; B60C 2009/2035
See application file for complete search history.

(56) References Cited

U.S. PATENT DOCUMENTS

2002/0079037 A1* 6/2002 Yukawa ................ B60C 9/2009
152/538
2007/0169870 A1* 7/2007 Manno ..................... B60C 9/28
152/531
(Continued)

FOREIGN PATENT DOCUMENTS

EP 3862195 A1 8/2021
EP 4116112 B1 * 11/2024 ......... B60C 15/0635
JP 2022-047999 A 3/2022

OTHER PUBLICATIONS

Extended European Search Report mailed Oct. 20, 2025 in corresponding European patent application No. EP25174140.1 (8 pages).

*Primary Examiner* — Cedrick S Williams
(74) *Attorney, Agent, or Firm* — XSENSUS LLP

(57) ABSTRACT

A tire includes a reinforcing layer positioned between a carcass and a tread. The reinforcing layer includes a belt and a band. The belt includes an inner belt ply and an outer belt ply. An inclination direction of the belt cords included in the inner belt ply is opposite to an inclination direction of the belt cords included in the outer belt ply. The band includes a full band obtained by spirally winding a full band strip. The full band is positioned between the inner belt ply and the outer belt ply. The full band strip includes a cord array including a plurality of band cords arrayed. The band cords included in the full band strip are not less than two and not greater than five in number.

16 Claims, 8 Drawing Sheets

(51) Int. Cl.
    *B60C 9/22*         (2006.01)
    *B60C 11/00*      (2006.01)
    *B60C 11/03*      (2006.01)

(56)           References Cited

U.S. PATENT DOCUMENTS

| 2014/0166178 A1 | 6/2014 | Sato |
| 2023/0141597 A1 | 5/2023 | Kitani |

\* cited by examiner

HEAVY DUTY TIRE

CROSS-REFERENCE TO RELATED APPLICATION

The present application claims priority based on Japanese Patent Application No. 2024-089683 filed on Jun. 3, 2024, and entire contents of this Japanese Patent Application are incorporated herein by reference.

TECHNICAL FIELD

The present disclosure relates to heavy duty tires.

BACKGROUND ART

A tire in a running state repeats deformation and restoration. A heavy duty tire tends to have outer radial growth. The outer radial growth influences uneven wear resistance and durability.

A tire includes a band as one of components thereof. The band includes a band cord extending substantially in a circumferential direction. The band can contribute to suppression of outer radial growth due to running.

Adopting such a band has been considered for suppression of outer radial growth and improvements in uneven wear resistance and durability (e.g., Japanese Laid-Open Patent Publication No. 2022-047999 (PATENT LITERATURE 1)).

SUMMARY OF THE INVENTION

Technical Problem

An object of the present disclosure is to provide a heavy duty tire that can be improved in uneven wear resistance and durability.

Solution to Problem

A heavy duty tire according to an aspect of the present disclosure includes: a pair of beads, a carcass extending between the pair of beads, a tread positioned radially outside the carcass and having a tread surface configured to come into contact with a road surface, and a reinforcing layer positioned radially between the carcass and the tread. The reinforcing layer includes a belt including a large number of belt cords arranged parallelly, and a band including a band cord spirally wound. The belt includes an inner belt ply and an outer belt ply aligned radially. An inclination direction of the belt cords included in the inner belt ply is opposite to an inclination direction of the belt cords included in the outer belt ply The band includes a full band obtained by spirally winding a full band strip. The full band is positioned between the inner belt ply and the outer belt ply. The full band strip includes a cord array in which a plurality of the band cords are arranged. The band cords included in the full band strip are not less than two and not greater than five in number.

Advantageous Effects of the Invention

The present disclosure can provide a heavy duty tire that can be improved in uneven wear resistance and durability.

DETAILED DESCRIPTION

Figure 1:
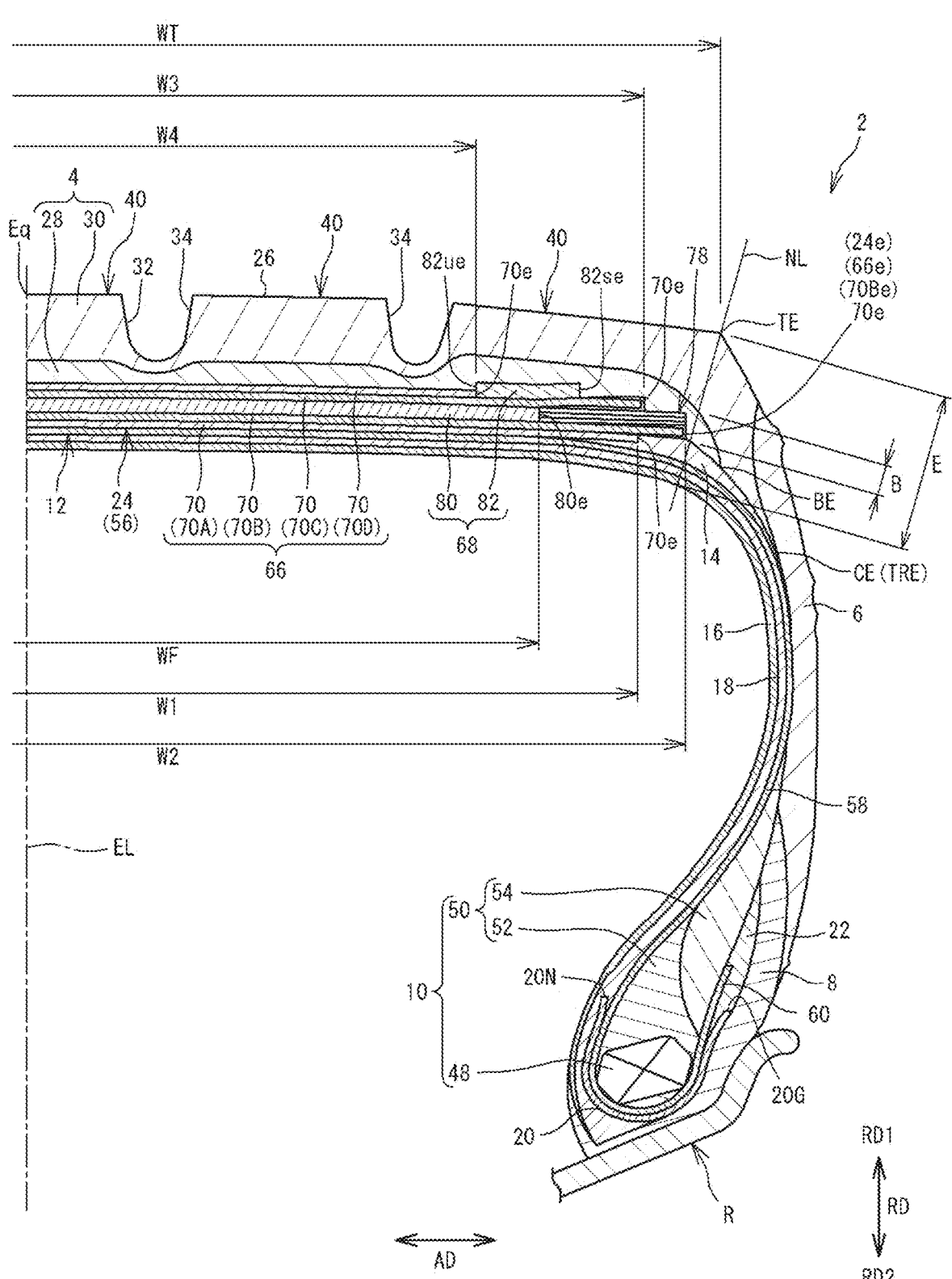
FIG. 1 is a sectional view showing part of a heavy duty tire according to an embodiment of the present disclosure.

Description is made in detail hereinafter to a preferred embodiment of the present disclosure with reference to the drawings as appropriate.

A tire according to the present disclosure is fitted on a rim. The inside of the tire is filled with air to adjust the internal pressure of the tire. The tire fitted on the rim is also referred to as tire-rim assembly. The tire-rim assembly includes the rim and the tire fitted on the rim.

In the present disclosure, a state where a tire is fitted on a normal rim, the internal pressure of the tire is adjusted to a normal internal pressure, and no load is applied to the tire is referred to as normal state.

In the present disclosure, unless otherwise specified, dimensions and angles of each component of the tire are measured in the normal state.

The dimensions and angles of each component in a meridian cross-section of the tire, which cannot be measured in a state where the tire is fitted on the normal rim, are measured in a cut plane of the tire obtained by cutting the tire along a plane including a rotation axis. In this measurement, the tire is set such that the distance between right and left beads is equal to the distance between the beads in the tire that is fitted on the normal rim. The configuration of the tire that cannot be checked in a state where the tire is fitted on the normal rim is checked in the cut plane described above.

The normal rim means a rim specified in a standard on which the tire is based. The "standard rim" in the JATMA standard, the "design rim" in the TRA standard, and the "measuring rim" in the ETRTO standard are normal rims.

The normal internal pressure means an internal pressure specified in the standard on which the tire is based. The "highest air pressure" in the JATMA standard, the "maximum value" recited in the "TIRE LOAD LIMITS AT VARIOUS COLD INFLATION PRESSURES" in the TRA standard, and the "inflation pressure" in the ETRTO standard are normal internal pressures.

A normal load means a load specified in the standard on which the tire is based. The "maximum load capacity" in the JATMA standard, the "maximum value" recited in the "TIRE LOAD LIMITS AT VARIOUS COLD INFLATION PRESSURES" in the TRA standard, and the "load capacity" in the ETRTO standard are normal loads.

The present disclosure refers to "nominal aspect ratio" indicating "nominal aspect ratio" included in the "nominal tyre" prescribed in "Automobile tyres-Designation and dimensions" in JIS D4202.

The present disclosure represents, as cord density (unit: ends/50 mm), the number of cords included per 50 mm width in a tire component including cords arranged parallelly. Unless otherwise specified, the cord density is obtained in a cut plane of the tire component cut along a plane perpendicular to a cord length direction. A tire component including a spirally wound cord also appears to include a plurality of cords arranged parallelly, so that its cord density can be obtained similarly to the tire component including the cords arranged parallelly.

In the present disclosure, a tread portion of a tire is a portion of the tire that comes into contact with a road surface. A bead portion is a portion of the tire that is fitted on a rim. A sidewall portion is a portion of the tire that extends between the tread portion and the bead portion. The tire includes, as portions thereof, a tread portion, a pair of bead portions, and a pair of sidewall portions.

A center portion of the tread portion is also referred to as crown portion. A portion at an end of the tread portion is also referred to as shoulder portion.

[Findings Supporting the Present Invention]

A belt includes a plurality of belt plies aligned radially. In a case where a full band is adopted as a band to be combined with the belt for suppression of outer radial growth due to running, the full band is stacked on the belt plies.

A low profile tire having an aspect ratio not greater than 65% is larger in outer radial growth in the shoulder portion than the crown portion. The low profile tire may thus be provided with an edge band in addition to the full band in order to restrain movement of the shoulder portion. In this case, the edge band is disposed radially outside an end of the full band.

The band includes a spirally wound band cord. The band is made of a band strip. A band strip used to form a full band is also referred to as full band strip, whereas a band strip used to form an edge band is also referred to as edge band strip.

The band strip includes a single or a plurality of band cords. In the case where the band strip includes a plurality of band cords, the plurality of band cords is aligned in a width direction in the band strip. In view of tire productivity, adopted as the band strip is a cord array including nine or ten arrayed band cords.

The inventors of the present disclosure have checked functional effects of a band strip in order to establish a technique for suppression of outer radial growth due to running, and have found that, although outer radial growth is suppressed as the band strip includes a fewer band cords, the band cords and belt cords tend to have a shorter distance therebetween. Particularly when the band strip includes a single band cord, the band cord and the belt cord may come into contact with each other (hereinafter, cord touch). Such cord touch can be prevented if the belt ply and the full band interpose a rubber sheet. However, this leads to addition of a step of disposing the rubber sheet between the belt ply and the full band to a tire manufacturing method, resulting in deterioration in tire productivity.

In view of this, the inventors of the present disclosure have diligently investigated to establish a technique for suppression of outer radial growth due to running as well as prevention of contact between a band cord and a belt cord in order to obtain a heavy duty tire that can be improved in uneven wear resistance and durability, and have completed the present disclosure to be described hereinafter.

SUMMARY OF EMBODIMENT OF THE PRESENT INVENTION

The present disclosure provides a heavy duty tire including a pair of beads, a carcass extending between the pair of beads, a tread positioned radially outside the carcass and having a tread surface configured to come into contact with a road surface, and a reinforcing layer positioned radially between the carcass and the tread, in which the reinforcing layer includes a belt including a large number of belt cords arranged parallelly, and a band including a band cord spirally wound, the belt includes an inner belt ply and an outer belt ply aligned radially, an inclination direction of the belt cords included in the inner belt ply is opposite to an inclination direction of the belt cords included in the outer belt ply, the band includes a full band obtained by spirally winding a full band strip, the full band is positioned between the inner belt ply and the outer belt ply, the full band strip includes a cord array in which a plurality of the band cords are arranged, and the band cords included in the full band strip are not less than two and not greater than five in number.

The heavy duty tire according to the present disclosure can be improved in uneven wear resistance and durability. A mechanism exhibiting such an effect of the tire is not clarified but is inferred as follows.

In the reinforcing layer of the tire according to the present disclosure, the full band is disposed between the inner belt ply and the outer belt ply. The reinforcing layer can contribute to suppression of outer radial growth due to running.

The band cords included in the full band extend substantially in a circumferential direction and the belt cords included in the outer belt ply are disposed to cross the belt cords included in the inner belt ply, so as to reduce shearing strain generated at rubber positioned between the band cords and the belt cords. The full band can stably and continuously exhibit a function of suppressing outer radial growth.

The band cords included in the full band strip are not greater than five in number, so that the full band obtained by spirally winding the full band strip can effectively contribute to suppression of outer radial growth. The band cords included in the full band strip are not less than two, so as to also suppress cord touch.

The tire can prevent contact between the band cords and the belt cords as well as can suppress outer radial growth due to running. The tire can be improved in uneven wear resistance and durability.

The tire does not need any rubber sheet disposed between the full band and the inner belt ply in order to prevent cord touch. The tire can suppress deterioration in productivity as well as can be improved in uneven wear resistance and durability.

Preferably, the band cords included in the full band strip are three in number. In this case, the tire can suppress deterioration in productivity as well as can be improved in uneven wear resistance and durability.

Preferably, the band further includes a pair of edge bands each obtained by spirally winding an edge band strip, the edge band strip includes a cord array in which a plurality of the band cords are arranged, and the pair of edge bands is positioned radially outside ends of the full band, respectively. In this case, each of the edge bands reinforces a portion including the end of the full band. The tire can effectively restrain movement of a shoulder portion. The tire can be improved in uneven wear resistance and durability because of suppressed outer radial growth.

Preferably, the band cords included in the edge band strip are not less than two and not greater than five in number. In this case, the tire can suppress deterioration in productivity as well as can be improved in uneven wear resistance and durability.

The tread of the tire includes a base portion and a cap portion. If the base portion is formed from a low-heat-generating crosslinked rubber and the cap portion is formed from a crosslinked rubber having wear resistance, the base portion can contribute to reduction in rolling resistance of the tire. However, the base portion is worse in physical properties than the cap portion. In view of uneven wear resistance and durability, the base portion included in the tread is preferably smaller in amount.

As described above, in a conventional tire, adopted as the band strip is a cord array including nine or ten arrayed band cords. In contrast, in the tire according to the present disclosure, the band cords included in the full band strip is not greater than five in number, which are fewer than the band cords in the band strip of the conventional tire. The full band is higher in holding force than the conventional tire. Movement of the shoulder portion is restrained, so that the tire can keep low rolling resistance even if the base portion is reduced in amount. Reduction in the amount of the base portion can contribute to improvements in uneven wear resistance and durability. In view of improvements in uneven wear resistance and durability of the tire, preferably, the tread includes a base portion positioned radially outside the reinforcing layer, and a cap portion positioned radially outside the base portion and having the tread surface, and on a normal line of the carcass passing through an end of the tread surface, a ratio of a thickness of the tire to a thickness of the base portion is not greater than 1/3. In this case, the tire can keep low rolling resistance as well as can be improved in uneven wear resistance and durability.

As described above, the present disclosure can provide a heavy duty tire that can be improved in uneven wear resistance and durability. This will be described in detail hereinafter by exemplifying a heavy duty tire shown in FIG. 1.

DETAILS OF EMBODIMENT OF THE PRESENT INVENTION

FIG. 1 shows part of a tire 2 according to an embodiment of the present disclosure. The tire 2 is mounted to a vehicle such as a truck or a bus. The tire 2 is a heavy duty tire.

The tire 2 is not greater than 65% in nominal aspect ratio. In other words, the tire 2 has a nominal aspect ratio not greater than 65%. The tire 2 is a low profile tire.

FIG. 1 shows part of a section (hereinafter, meridian cross-section) of the tire 2 along a plane including a rotation axis of the tire 2.

Figure 2A:
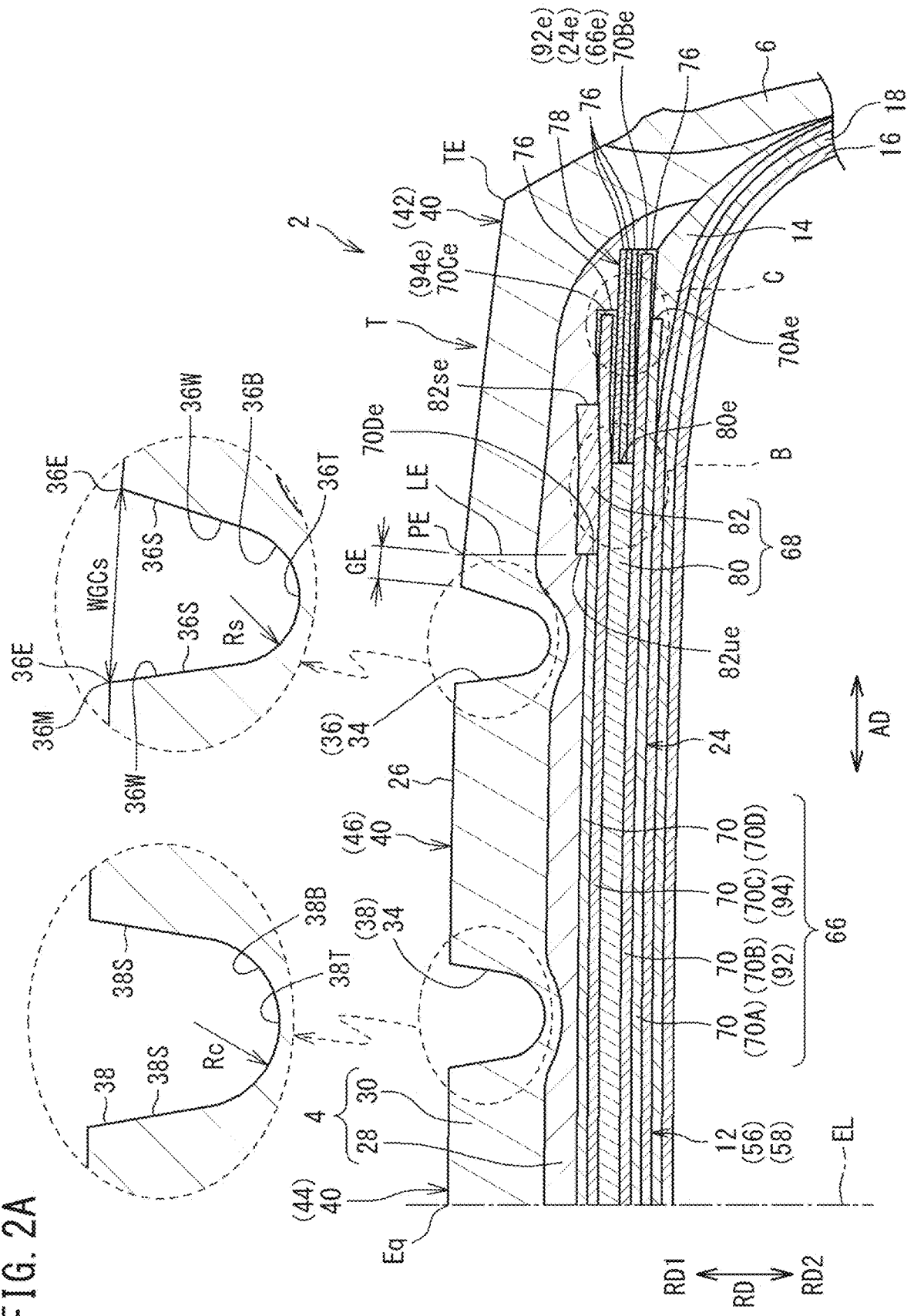
FIG. 2A is an enlarged sectional view showing part of the tire in FIG. 1.

FIG. 2A shows part of the section shown in FIG. 1. FIG. 2A shows a tread portion T of the tire 2.

Figure 2B:
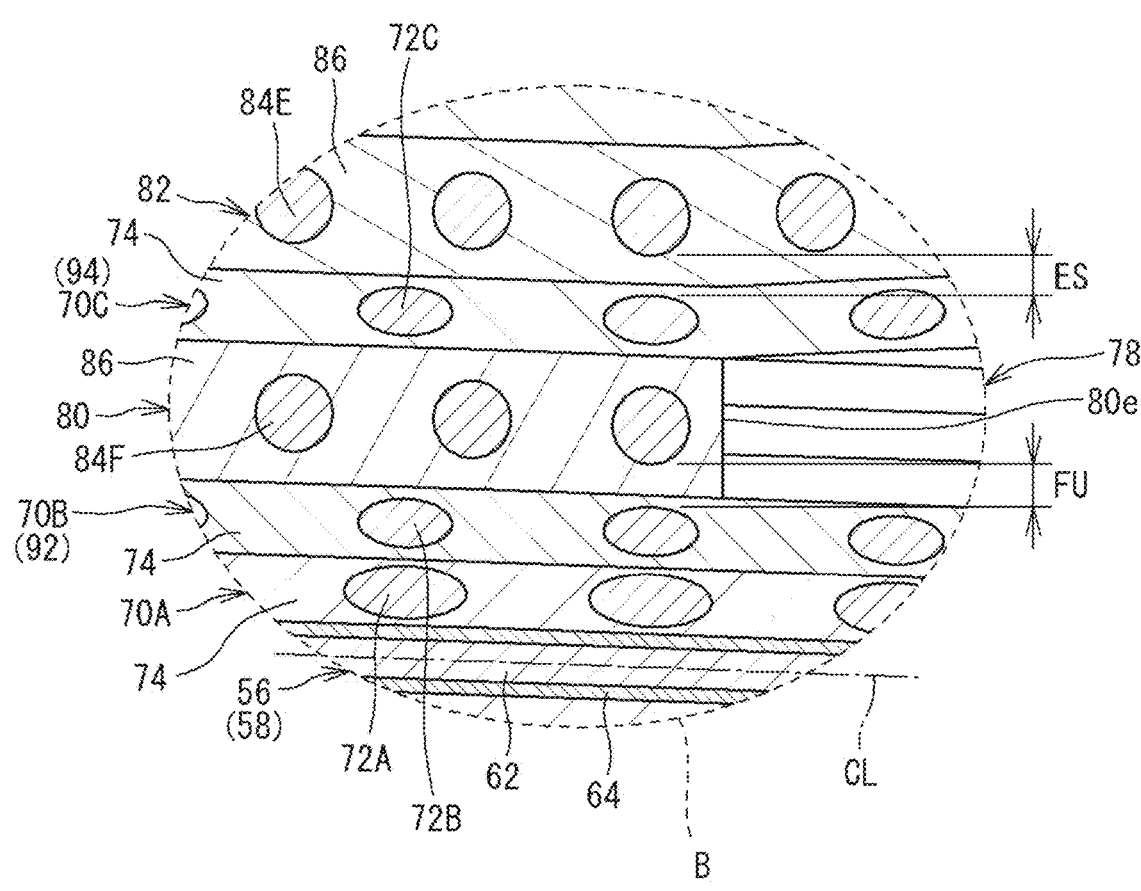
FIG. 2B is an enlarged sectional view showing portion B in FIG. 2A.

FIG. 2B shows a portion (hereinafter, portion B) surrounded with dotted line B in FIG. 2A.

Figure 2C:
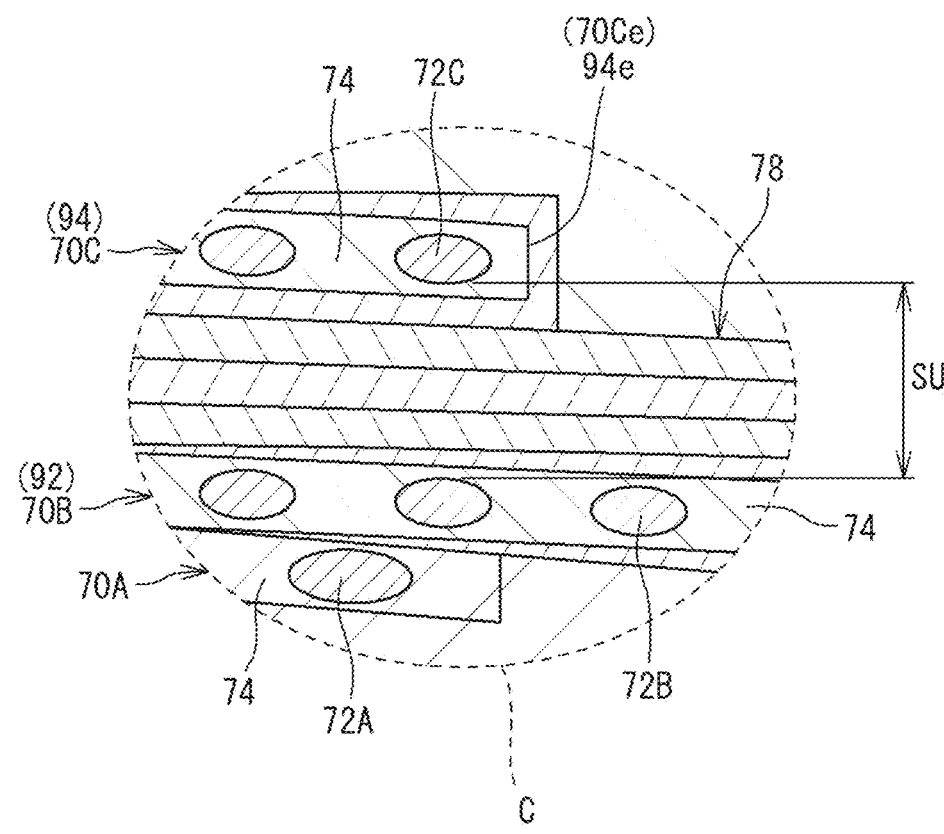
FIG. 2C is an enlarged sectional view showing portion C in FIG. 2A.

FIG. 2C shows a portion (hereinafter, portion C) surrounded with dotted line C in FIG. 2A.

A double-pointed arrow AD indicates an axial direction of the tire 2. The axial direction of the tire 2 means a direction parallel to a rotation axis of the tire 2. A double-pointed arrow RD indicates a radial direction of the tire 2. A direction perpendicular to the sheet of FIG. 1 is a circumferential direction of the tire 2.

Dashed line EL extending radially indicates an equator plane of the tire 2.

A direction from the equator plane to an end of the tread surface to be described later corresponds to an axially outward direction of the tire 2, whereas a direction from the end of the tread surface to the equator plane corresponds to an axially inward direction of the tire 2.

A direction indicated by an arrow RD1 corresponds to a radially outward direction of the tire 2, whereas a direction indicated by an arrow RD2 corresponds to a radially inward direction of the tire 2.

The tire 2 shown in FIG. 1 and FIG. 2 is in a state of being fitted on a rim R (normal rim).

The tire 2 includes a tread 4, a pair of sidewalls 6, a pair of chafers 8, a pair of beads 10, a carcass 12, a pair of cushion layers 14, an inner liner 16, an insulation 18, a pair of steel fillers 20, a pair of interlayer strips 22, and a reinforcing layer 24.

The tread 4 is positioned radially outside the carcass 12. The tread 4 covers the reinforcing layer 24.

The tread 4 has a tread surface 26 configured to come into contact with a road surface. The tire 2 comes into contact with a road surface at the tread surface. The tread surface 26 has ends indicated as positions TE.

The tread surface 26 has a width WT represented as an axial distance from a first end TE of the tread surface 26 to a second end TE of the tread surface 26.

In the tire, when the end of the tread surface cannot be identified from the appearance, assumed as the end of the tread surface is a position on an outer surface of the tire corresponding to an axially outer end of a ground-contact surface obtained by applying a normal load to the tire in the normal state with a camber angle set to 0 degrees and bringing the tire into contact with a plane.

The tread surface 26 and the equator plane have a point of intersection Eq on an equator. In a case where the equator plane is provided with a groove, the equator is specified based on a virtual tread surface obtained assuming that the groove is not provided.

The tread 4 includes a base portion 28 and a cap portion 30. The base portion 28 is positioned radially outside the reinforcing layer 24. The base portion 28 entirely covers the reinforcing layer 24. The base portion 28 is formed from a low-heat-generating crosslinked rubber. The cap portion 30 is positioned radially outside the base portion 28. The cap portion 30 is formed from a crosslinked rubber having wear resistance and grip performance. The cap portion 30 has the tread surface 26.

In FIG. 1, a position indicated by a reference sign BE is a radially inner end of the base portion 28. A position indicated by a reference sign CE is a radially inner end of the cap portion 30.

The inner end CE of the cap portion 30 is positioned radially inside the inner end BE of the base portion 28. The inner end BE of the base portion 28 is covered with the cap portion 30. The cap portion 30 entirely covers the base portion 28. The inner end CE of the cap portion 30 corresponds to a radially inner end TRE of the tread 4. The inner end TRE of the tread 4 is positioned between the sidewall 6 and the cushion layer 14.

The tread 4 includes a groove 32 carved therein. The groove 32 thus provided forms a tread pattern. The tread pattern in the tread 4 of the tire 2 includes a plurality of circumferential grooves 34 continuously extending in the circumferential direction. The tread 4 includes four circumferential grooves 34. The circumferential grooves 34 are aligned axially and extend straight in the circumferential direction. FIG. 1 and FIG. 2 show sections of the circumferential grooves 34 corresponding to sections along a plane perpendicular to a length direction of the circumferential grooves 34.

Figure 3:
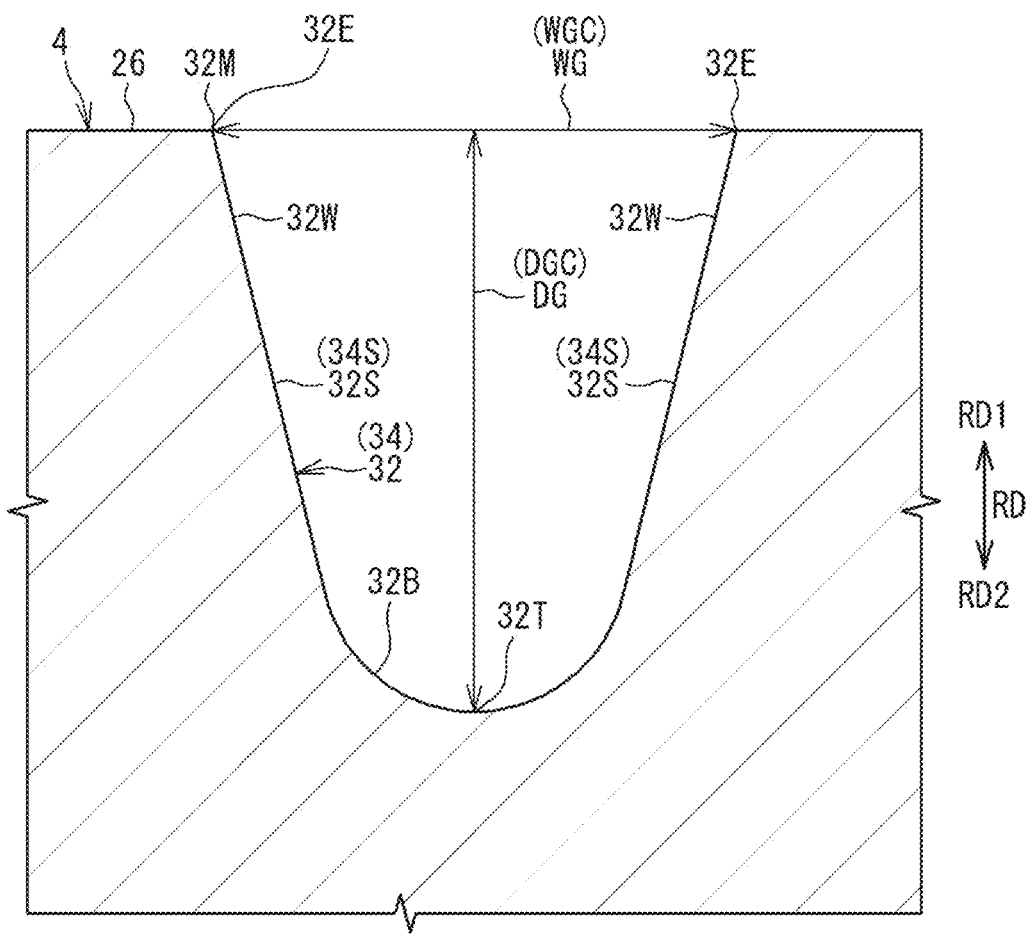
FIG. 3 is a sectional view of a circumferential groove.

FIG. 3 shows part of the tire 2 shown in FIG. 2A. FIG. 3 shows a section of the circumferential groove 34, specifically, a shoulder circumferential groove to be described later. The groove 32 will be described in terms of its principal configuration with reference to the section of the circumferential groove 34 shown in FIG. 3.

The groove 32 includes a pair of groove walls 32W extending between a groove opening 32M and a groove bottom 32T. The groove 32 has a portion including the groove bottom 32T and also referred to as bottom surface 32B. Each of the groove walls 32W includes a portion other than the bottom surface 32B, that is, a portion between the bottom surface 32B and the groove opening 32M, and the portion is also referred to as wall surface 32S. The groove 32 has a pair of wall surfaces 32S including the groove opening 32M, and the bottom surface 32B including the groove bottom 32T.

The groove bottom 32T is located at the deepest position in the section of the groove 32. Along a normal line of a plane including left and right edges 32E forming the groove opening 32M, measured is a distance from the plane to the bottom surface 32B. The groove bottom 32T is located at a position where the distance from the plane to the bottom surface 32B is the longest. The normal line of the plane including the left and right edges 32E extends in a depth direction of the groove 32.

The bottom surface 32B is curved in FIG. 3. The bottom surface 32B may alternatively be formed as a flat surface. In this case, set as the groove bottom 32T is a width center of the flat surface forming the bottom surface 32B. In a case where the bottom surface 32B is provided with a projection, the groove bottom 32T is specified based on a virtual bottom surface obtained assuming that the projection is not provided.

In FIG. 3, a length indicated by a double-headed arrow WG is a groove width at the groove opening 32M of the groove 32. The groove width WG is measured along the plane including the pair of edges 32E forming the groove opening 32M. In a case where a portion at the groove opening 32M of the groove 32 is processed to be tapered, the groove width at the groove opening 32M of the groove 32 is represented based on a virtual edge obtained assuming that the portion is not processed to be tapered. A length indicated by a double-headed arrow DG is a groove depth of the groove 32. The groove depth DG of the groove 32 is represented as the shortest distance from the plane including the left and right edges 32E to the groove bottom 32T of the groove 32.

Each of the four circumferential grooves 34 has a large groove width such that a pair of wall surfaces 34S of the circumferential groove 34 do not come into contact with each other even when the tread 4 comes into contact with a road surface to be deformed. The circumferential grooves 34 are also referred to as circumferential main grooves. In view of contributions to drainage performance and traction performance, the circumferential grooves 34 each have a groove width WGC that is preferably not less than 2% and not greater than 10% of the width WT of the tread surface 26.

As described above, the tread 4 of the tire 2 includes the four circumferential grooves 34.

In the present disclosure, the plurality of circumferential grooves carved in the tread includes a circumferential groove that is positioned axially outermost and is referred to as shoulder circumferential groove. A circumferential groove positioned on the equator plane is provided as a center circumferential groove. In a case where no circumferential groove is provided on the equator plane, the circumferential groove closest to the equator plane corresponds to the center circumferential groove. In a case where the center circumferential groove and the shoulder circumferential groove interpose any circumferential groove, the circumferential groove interposed between the center circumferential groove and the shoulder circumferential groove is referred to as middle circumferential groove.

In the tire 2, the four circumferential grooves 34 formed in the tread 4 include a circumferential groove 36 that is positioned axially outermost and corresponds to the shoulder circumferential groove. A circumferential groove 38 closest to the equator plane corresponds to the center circumferential groove. The four circumferential grooves 34 include a pair of center circumferential grooves 38 and a pair of shoulder circumferential grooves 36. The shoulder circumferential grooves 36 are positioned axially outside the center circumferential grooves 38, respectively.

The plurality of circumferential grooves 34 is carved in the tread 4 so as to form a plurality of land portions 40 aligned axially. In other words, the tread 4 includes the plurality of circumferential grooves 34 that provides the tread 4 with the plurality of land portions 40.

The four circumferential grooves 34 are carved in the tread 4 of the tire 2 so as to form five land portions 40. The land portions 40 are aligned axially.

In the present disclosure, the plurality of land portions formed on the tread includes a land portion that is positioned axially outermost and is provided as a shoulder land portion. The land portion positioned on the equator plane is provided as a center land portion. In a case where no land portion is provided on the equator plane, the land portion closest to the equator plane corresponds to the center land portion. Any land portion interposed between the center land portion and the shoulder land portion is referred to as middle land portion.

As described above, the five land portions 40 are formed on the tread 4. The five land portions 40 include a land portion 42 that is positioned axially outermost and corresponds to the shoulder land portion. A land portion 44 positioned on the equator plane corresponds to the center land portion. The center land portion 44 and the shoulder land portion 42 interpose a land portion 46 corresponding to the middle land portion.

The five land portions 40 include the center land portion 44, a pair of middle land portions 46, and a pair of shoulder land portions 42. The middle land portions 46 are positioned axially outside the center land portion 44. The shoulder land portions 42 are positioned axially outside the middle land portions 46. The shoulder land portions 42 each include the end TE of the tread surface 26.

The center land portion 44 has an axial width not less than 10% and not greater than 18% of the width WT of the tread surface 26. The middle land portions 46 each have an axial width not less than 10% and not greater than 18% of the width WT of the tread surface 26. The shoulder land portions 42 each have an axial width not less than 15% and not greater than 25% of the width WT of the tread surface 26. Each of the land portions 40 has an axial width represented as an axial width at a top surface of the land portion 40 as part of the tread surface 26.

The sidewalls 6 are provided continuously to end portions of the tread 4, respectively. The sidewalls 6 are positioned axially outside the carcass 12. The sidewalls 6 are each formed from a crosslinked rubber.

The chafers 8 are positioned radially inside the sidewalls 6, respectively. The chafers 8 are in contact with the rim R. The chafers 8 are each formed from a crosslinked rubber having wear resistance.

The beads 10 are positioned axially inside the chafers 8, respectively. The beads 10 are positioned radially inside the sidewalls 6, respectively.

The beads 10 each include a core 48 and an apex 50.

The core 48 extends circumferentially. Though not shown, the core 48 includes a wound steel wire.

The apex 50 is positioned radially outside the core 48. The apex 50 extends radially outward from the core 48. The apex 50 is tapered outward.

The apex 50 includes an inner apex 52 and an outer apex 54. The inner apex 52 is positioned radially outside the core 48. The outer apex 54 is positioned radially outside the inner apex 52.

The inner apex 52 is tapered outward. The inner apex 52 is formed from a hard crosslinked rubber.

The outer apex 54 is thick around a radially outer end of the inner apex 52. The outer apex 54 is tapered inward and tapered outward from such a thick portion.

The outer apex 54 is formed from a crosslinked rubber. The outer apex 54 is softer than the inner apex 52.

The carcass 12 is positioned inside the tread 4, the pair of sidewalls 6, and the pair of chafers 8. The carcass 12 extends between the pair of beads 10. The carcass 12 of the tire 2 has a radial structure.

The carcass 12 includes at least one carcass ply 56. The carcass 12 of the tire 2 is composed of a single carcass ply 56. The carcass ply 56 is turned up at the beads 10.

The carcass ply 56 includes a ply body 58 and a pair of turned-up portions 60. The ply body 58 extends between the pair of beads 10, that is, between a first bead 10 and a second bead 10 (not shown). The turned-up portions 60 are provided continuously to the ply body 58 and are turned up at the beads 10, respectively. The turned-up portions 60 of the tire 2 are turned up at the beads 10 outward from axially insides, respectively.

As shown in FIG. 2B, the carcass ply 56 includes a large number of carcass cords 62 arranged parallelly. The carcass cords 62 are covered with a topping rubber 64. The carcass cords 62 cross the equator plane. The carcass cords 62 cross the equator plane at an angle not less than 70 degrees and not greater than 90 degrees. The carcass cords 62 of the tire 2 are steel cords.

In FIG. 2B, a dashed line CL is a center line of the carcass cords 62. The carcass 12 has a contour, in other words, a case line indicated by the center line of the carcass cords 62 included in the ply body 58. The carcass 12 has a normal line to be described later and indicated by a normal line of the case line CL. In a case where the carcass 12 is composed of not less than two carcass plies 56, the case line CL is indicated by the center line of the carcass cords 62 included in the ply body 58 positioned outermost.

The cushion layers 14 are positioned between the reinforcing layer 24 and the carcass 12 at respective ends of the reinforcing layer 24. The cushion layers 14 are each formed from a soft crosslinked rubber.

The inner liner 16 is positioned inside the carcass 12. The inner liner 16 forms an inner surface of the tire 2. The inner liner 16 is formed from a crosslinked rubber having a low gas transmission coefficient. The inner liner 16 maintains the internal pressure of the tire 2.

The insulation 18 is positioned between the carcass 12 and the inner liner 16. The insulation 18 is joined to the carcass 12 and is joined to the inner liner 16. In other words, the inner liner 16 is joined to the carcass 12 via the insulation 18. The insulation 18 is formed from a crosslinked rubber having adhesiveness.

The steel fillers 20 are positioned between the carcass 12 and the chafers 8, respectively. The steel fillers 20 are turned up at the beads 10 along the carcass ply 56. The steel fillers 20 are disposed to wrap radially inner portions of the beads 10 from radially inside the carcass 12.

The steel fillers 20 have inner ends 20N positioned radially between the outer end of the inner apex 52 and the core 48. The steel fillers 20 have outer ends 20G positioned radially between ends of the turned-up portions 60 and the core 48, respectively.

Though not shown, the steel fillers 20 each include a large number of filler cords arranged parallelly. The filler cords are covered with a topping rubber. The filler cords of the tire 2 are steel cords.

The interlayer strips 22 are positioned axially between the apex 50 and the chafers 8, respectively. The interlayer strips 22 cover the ends of the turned-up portions 60 and the outer ends 20G of the steel fillers 20, respectively. The interlayer strips 22 are each formed from a crosslinked rubber.

The reinforcing layer 24 is positioned radially outside the carcass 12. The reinforcing layer 24 is positioned radially inside the tread 4. The reinforcing layer 24 is positioned radially between the carcass 12 and the tread 4. The reinforcing layer 24 includes a belt 66 and a band 68.

Figure 4:
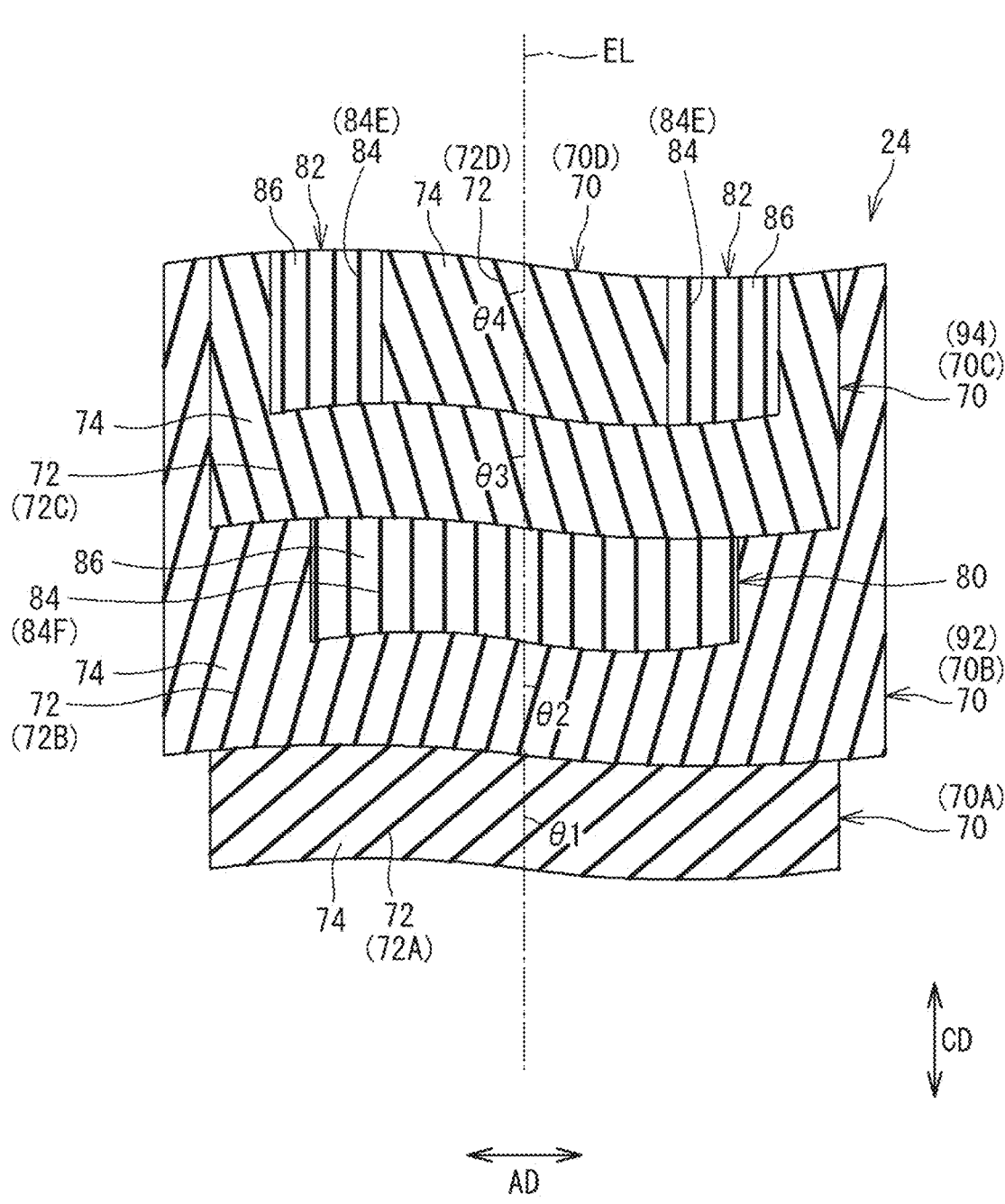
FIG. 4 is an explanatory schematic view of a configuration of a reinforcing layer.

FIG. 4 shows a configuration of the reinforcing layer 24. A double-pointed arrow CD indicates the circumferential direction of the tire 2. A direction perpendicular to the sheet of FIG. 4 is the radial direction of the tire 2. A front side of the sheet corresponds to a radially outside, whereas a rear side of the sheet corresponds to a radially inside.

The belt 66 includes at least two belt plies 70 aligned radially. The belt plies 70 have both ends 70e opposing each other to interpose the equator plane. The belt plies 70 cross the equator plane.

The belt 66 of the tire 2 includes four belt plies 70. The four belt plies 70 include a first belt ply 70A, a second belt ply 70B, a third belt ply 70C, and a fourth belt ply 70D.

The belt 66 may alternatively be composed of two or three belt plies 70.

The first belt ply 70A corresponds to the belt ply 70 positioned radially innermost among the four belt plies 70 forming the belt 66. The second belt ply 70B is positioned radially outside the first belt ply 70A. The third belt ply 70C is positioned radially outside the second belt ply 70B. The fourth belt ply 70D is positioned radially outside the third belt ply 70C. The fourth belt ply 70D corresponds to the belt ply 70 positioned radially outermost among the four belt plies 70 forming the belt 66.

As shown in FIG. 1, the first belt ply 70A of the tire 2 is stacked on the carcass 12. The second belt ply 70B is stacked on the first belt ply 70A. The fourth belt ply 70D is stacked on the third belt ply 70C. In the tire 2, the second belt ply 70B and the third belt ply 70C interpose a full band to be described later.

In FIG. 1, a length indicated by a double-pointed arrow W1 is an axial width of the first belt ply 70A. A length indicated by a double-pointed arrow W2 is an axial width of the second belt ply 70B. A length indicated by a double-pointed arrow W3 is an axial width of the third belt ply 70C. A length indicated by a double-pointed arrow W4 is an axial width of the fourth belt ply 70D. The axial width of each of the belt plies 70 is represented as an axial distance from a first end 70e to a second end 70e of the belt ply 70.

In the tire 2, the second belt ply 70B has the largest axial width W2 whereas the fourth belt ply 70D has the smallest axial width W4. The first belt ply 70A and the third belt ply 70C may be substantially equal in axial width, or the axial width W1 of the first belt ply 70A is slightly smaller than the axial width W3 of the third belt ply 70C.

The belt according to the present disclosure has an end represented as the end of the belt ply having the largest axial width among the plurality of belt plies forming the belt.

As described above, the second belt ply 70B has the largest axial width W2 in the tire 2. The belt 66 of the tire 2 has an end 66e represented as an end 70Be of the second belt ply 70B. The end 66e of the belt 66 also corresponds to an end 24e of the reinforcing layer 24.

As shown in FIG. 2A, the first belt ply 70A has an end 70Ae positioned axially outside the shoulder circumferential groove 36. The second belt ply 70B has the end 70Be also positioned axially outside the shoulder circumferential groove 36. The third belt ply 70C has an end 70Ce also positioned axially outside the shoulder circumferential groove 36. The fourth belt ply 70D has an end 70De also positioned axially outside the shoulder circumferential groove 36. In the tread portion T shown in FIG. 2A, the ends 70e of all the belt plies 70 forming the belt 66 are positioned axially outside the shoulder circumferential groove 36. The end 70De of the fourth belt ply 70D may alternatively be positioned axially inside the shoulder circumferential groove 36.

In order to secure stiffness of the tread portion T in the tire 2, a ratio (W1/WT) of the axial width W1 of the first belt ply 70A to the width WT of the tread surface 26 is preferably not less than 0.80 and not greater than 0.90. A ratio (W2/WT) of the axial width W2 of the second belt ply 70B to the width WT of the tread surface 26 is preferably not less than 0.85 and not greater than 0.95. A ratio (W3/WT) of the axial width W3 of the third belt ply 70C to the width WT of the tread surface 26 is preferably not less than 0.80 and not greater than 0.90. The axial width W4 of the fourth belt ply 70D is set appropriately in accordance with specifications of the tire 2.

As shown in FIG. 4, the belt plies 70 forming the belt 66 each include a large number of belt cords 72 arranged parallelly. For convenient description, the belt cords 72 are indicated by solid lines but are actually covered with a topping rubber 74.

The belt cords 72 of the tire 2 are steel cords. The belt plies 70 each have a cord density not less than 15 ends/50 mm and not greater than 30 ends/50 mm.

The belt cords 72 in each of the belt plies 70 are inclined relative to the circumferential direction.

The direction in which the belt cords 72 included in the first belt ply 70A are inclined (hereinafter, the inclination direction of the first belt cords 72A) is identical to the direction in which the belt cords 72 included in the second belt ply 70B are inclined (hereinafter, the inclination direction of the second belt cords 72B).

the inclination direction of the second belt cords 72B is opposite to the direction in which the belt cords 72 included in the third belt ply 70C are inclined (hereinafter, the inclination direction of the third belt cords 72C).

the inclination direction of the third belt cords 72C is identical to the direction in which the belt cords 72 included in the fourth belt ply 70D are inclined (hereinafter, the inclination direction of the fourth belt cords 72D).

The inclination direction of the first belt cords 72A may alternatively be oppose to the inclination direction of the second belt cords 72B. The inclination direction of the third belt cords 72C may alternatively be oppose to the inclination direction of the fourth belt cords 72D.

In FIG. 4, an angle $\theta1$ is an inclination angle (hereinafter, the first inclination angle $\theta1$) of the first belt cords 72A relative to the equator plane. An angle $\theta2$ is an inclination angle (hereinafter, the second inclination angle $\theta2$) of the second belt cords 72B relative to the equator plane. An angle $\theta3$ is an inclination angle (hereinafter, the third inclination angle $\theta3$) of the third belt cords 72C relative to the equator plane. An angle $\theta4$ is an inclination angle (hereinafter, the fourth inclination angle $\theta4$) of the fourth belt cords 72D relative to the equator plane.

The first inclination angle $\theta1$, the second inclination angle $\theta2$, the third inclination angle $\theta3$, and the fourth inclination angle $\theta4$ are preferably not less than 10 degrees and not greater than 60 degrees.

In order to effectively restrain movement of the tread portion T and obtain a ground-contact surface having a stable shape with smaller changes, the first inclination angle $\theta1$ is more preferably not less than 40 degrees and not greater than 60 degrees. The second inclination angle $\theta2$ is more preferably not less than 15 degrees and not greater than 30 degrees, and is further preferably not less than 15 degrees and not greater than 20 degrees. The third inclination angle $\theta3$ is more preferably not less than 15 degrees and not greater than 30 degrees, and is further preferably not less than 15 degrees and not greater than 20 degrees. The fourth inclination angle $\theta4$ is more preferably not less than 15 degrees and not greater than 50 degrees.

As shown in FIG. 2A, the end 70Be of the second belt ply 70B and the end 70Ce of the third belt ply 70C are each covered with a rubber layer 76. The end 70Be of the second belt ply 70B and the end 70Ce of the third belt ply 70C each covered with the rubber layer 76 interpose additional three rubber layers 76. In the tire 2, the end 70Be of the second belt ply 70B and the end 70Ce of the third belt ply 70C interpose an edge member 78 made of totally five rubber layers 76. The edge member 78 is formed from a crosslinked rubber. The edge member 78 contributes to keeping an interval between the end 70Be of the second belt ply 70B and the end 70Ce of the third belt ply 70C. The tire 2 can suppress changes in positional relationship due to running, between the end 70Be of the second belt ply 70B and the end 70Ce of the third belt ply 70C. The edge member 78 is part of the reinforcing layer 24. The reinforcing layer 24 of the tire 2 includes a pair of edge members 78 in addition to the belt 66 and the band 68.

The band 68 includes a full band 80. The full band 80 has both ends 80e opposing each other to interpose the equator plane. The full band 80 crosses the equator plane. Each of the ends 80e of the full band 80 is positioned axially between the shoulder circumferential groove 36 and the end 66e of the belt 66.

In FIG. 1, a length indicated by double-pointed arrow WF is an axial width of the full band 80. The axial width WF of the full band 80 is represented as an axial distance from a first end 80e to a second end 80e of the full band 80. In order to secure stiffness of the tread portion T, a ratio (WF/WT) of the axial width WF of the full band 80 to the width WT of the tread surface 26 is preferably not less than 0.70 and not greater than 0.80.

The band 68 of the tire 2 can include a pair of edge bands 82 in addition to the full band 80. The pair of edge bands 82 is disposed to be axially separate from each other and interpose the equator plane. Each of the edge bands 82 is positioned axially outside the fourth belt ply 70D. The edge band 82 is positioned axially between the shoulder circumferential groove 36 and the end 66e of the belt 66. The edge band 82 is positioned radially between the tread 4 and the full band 80.

As shown in FIG. 4, the full band 80 and the edge bands 82 forming the band 68 each include a spirally wound band cord 84. For convenient description, the band cord 84 is indicated by solid lines but is actually covered with a topping rubber 86.

In each of the full band 80 and the edge bands 82, the band cord 84 extends substantially in the circumferential direction. Specifically, an angle of the band cord 84 relative to the circumferential direction is preferably not greater than 5 degrees and more preferably not greater than 2 degrees.

The band cord 84 of the tire 2 is a steel cord. The band cord 84 may be a cord formed from an organic fiber (hereinafter, organic fiber cord). In this case, examples of the organic fiber include nylon fiber, polyester fiber, rayon fiber, and aramid fiber. A band cord 84F for the full band 80 and band cords 84E for the edge bands 82 may be the same or different. The specifications of the tire 2 determine the band cords 84 for the full band 80 and the edge bands 82.

Though not detailed, the tire 2 shown in FIG. 1 is manufactured in accordance with a known method. Constituent components such as the tread 4 and the sidewalls 6 are combined to prepare the tire 2 in an unvulcanized state, that is, a green tire (not shown). The green tire is pressurized and heated in a mold to obtain the tire 2.

Figure 5:
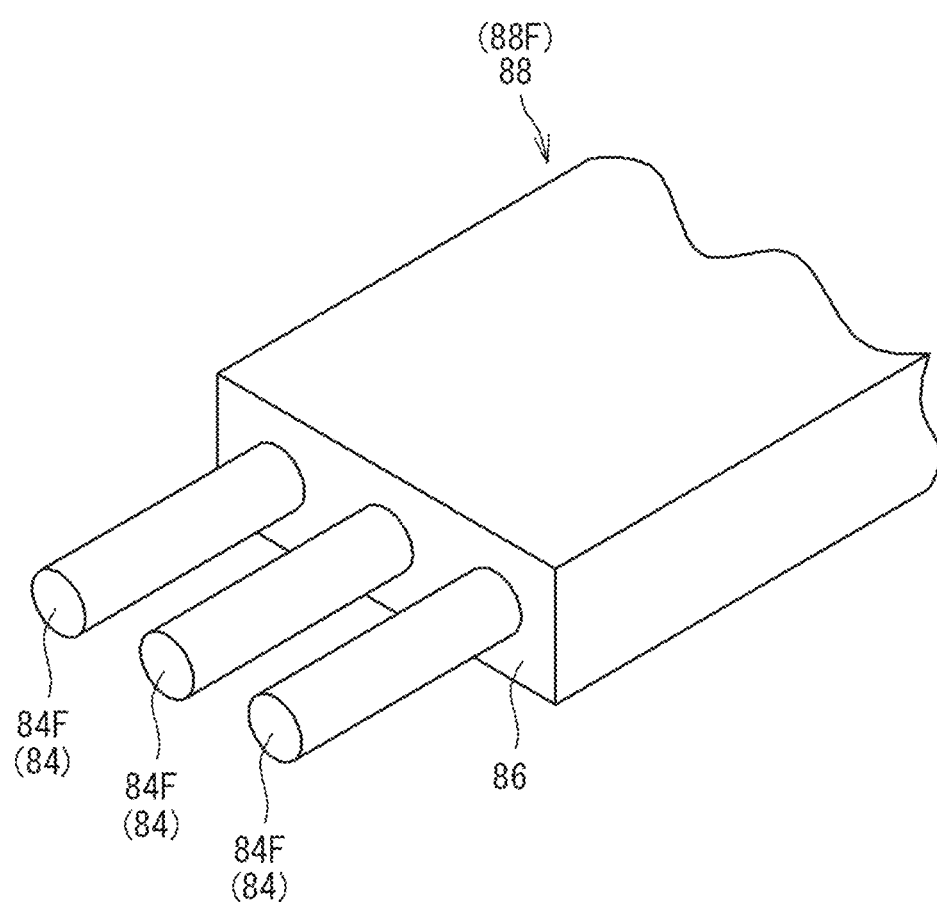
FIG. 5 is a perspective view showing part of a full band strip.

The band 68 is formed with a band strip 88. FIG. 5 shows the band strip 88 (hereinafter, full band strip 88F) used to form the full band 80.

The full band strip 88F has a band shape. The full band strip 88F includes a plurality of band cords 84F. The full band strip 88F shown in FIG. 5 includes three band cords 84F. The band cords 84F are aligned in a width direction of the full band strip 88F and extend in a length direction of the full band strip 88F. The full band strip 88F includes a cord array in which the plurality of band cords 84F are arranged. The full band strip 88F is the cord array. The cord array includes the plurality of band cords 84F arrayed. In the full band strip 88F, the band cords 84F are adjacent to each other at an interval not less than 0.5 mm and not greater than 2.0 mm.

Figure 6:
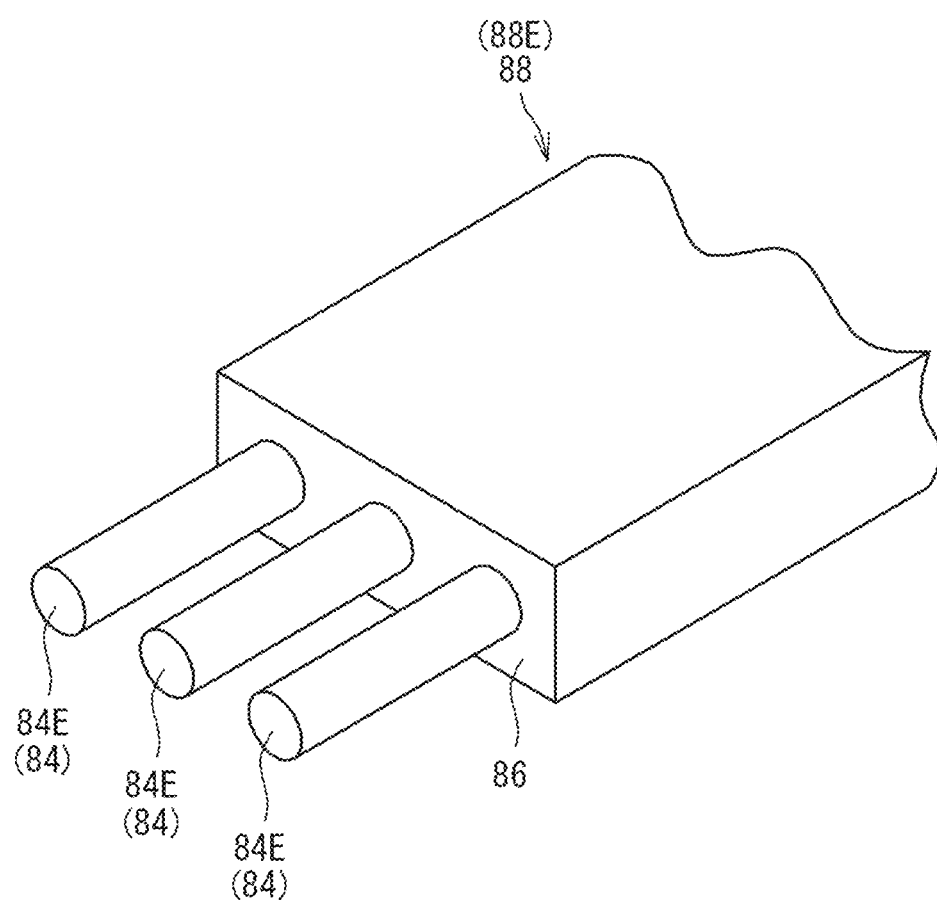
FIG. 6 is a perspective view showing part of an edge band strip.

FIG. 6 shows the band strip 88 (hereinafter, edge band strip 88E) used to form the edge band 82. The edge band strip 88E is configured similarly to the full band strip 88F. The edge band strip 88E includes a cord array in which the plurality of band cords 84E are arranged. The edge band strip 88E is the cord array. The cord array includes the plurality of band cords 84E arrayed. In the edge band strip 88E, the band cords 84E are adjacent to each other at an interval not less than 0.5 mm and not greater than 2.0 mm.

The band 68 is obtained by spirally winding the band strip 88. Specifically, the band 68 is a crosslinked product of a band form obtained by spirally winding the band strip 88. The full band 80 is a constituent component of the tire 2 and is obtained by spirally winding the full band strip 88F. The edge band 82 is a constituent component of the tire 2 and is obtained by spirally winding the edge band strip 88E.

The band 68 of the tire 2 includes the full band 80 obtained by spirally winding the full band strip 88F and the pair of edge bands 82 each obtained by spirally winding the edge band strip 88E.

In the tire 2, the full band strip 88F and the edge band strip 88E are configured identically to each other. The full band strip 88F and the edge band strip 88E may alternatively be configured differently from each other.

The full band 80 of the tire 2 is positioned between the second belt ply 70B and the third belt ply 70C. The second belt ply 70B is positioned radially inside the full band 80, whereas the third belt ply 70C is positioned radially outside the full band 80. As described above, the inclination direction of the second belt cords 72B is opposite to the inclination direction of the third belt cords 72C.

The full band 80 is positioned between two belt plies 70 in which the inclination directions of the belt cords 72 are opposite to each other.

In the present disclosure, in the case where the full band is positioned between the two belt plies in which the inclination directions of the belt cords are opposite to each other, the belt ply positioned radially inside the full band is referred to as inner belt ply whereas the belt ply positioned radially outside the full band is referred to as outer belt ply.

In the tire 2, the full band 80 is positioned between the second belt ply 70B and the third belt ply 70C, and the inclination directions of the second belt cords 72B and the third belt cords 72C are opposite. The second belt ply 70B is provided as an inner belt ply 92, and the third belt ply 70C is provided as an outer belt ply 94. That is, the full band 80 is positioned between the inner belt ply 92 and the outer belt ply 94, and the inclination direction of the belt cords 72 included in the inner belt ply 92 is opposite to the inclination direction of the belt cords 72 included in the outer belt ply 94.

In another case where the full band 80 is positioned between the first belt ply 70A and the second belt ply 70B and the inclination direction of the first belt cords 72A is opposite to the inclination direction of the second belt cords 72B, the first belt ply 70A corresponds to the inner belt ply and the second belt ply 70B corresponds to the outer belt ply. In still another case where the full band 80 is positioned between the third belt ply 70C and the fourth belt ply 70D and the inclination direction of the third belt cords 72C is opposite to the inclination direction of the fourth belt cords 72D, the third belt ply 70C corresponds to the inner belt ply and the fourth belt ply 70D corresponds to the outer belt ply.

In the reinforcing layer 24 of the tire 2, the full band 80 is disposed between the inner belt ply 92 and the outer belt ply 94. The reinforcing layer 24 can contribute to suppression of outer radial growth due to running.

The band cords 84F included in the full band 80 extend substantially in the circumferential direction and the belt cords 72 included in the outer belt ply 94 are disposed to cross the belt cords 72 included in the inner belt ply 92, so as to reduce shearing strain generated at rubber positioned between the band cords 84F and the belt cords 72. The full band 80 can stably and continuously exhibit a function of suppressing outer radial growth.

The band cords 84F included in the full band strip 88F of the tire 2 are not less than two and not greater than five in number.

The band cords 84F included in the full band strip 88F are not greater than five in number, so that the band cords 84F can effectively restrain movement of the tread portion T intended to expand outward due to the internal pressure and centrifugal force of the tire 2 in comparison to a case where the full band strip is a cord array including nine or ten arrayed band cords. The full band 80 obtained by spirally winding the full band strip 88F can effectively contribute to suppression of outer radial growth. In view of this, the band cords 84F included in the full band strip 88F are preferably not greater than four in number.

The band cords 84F included in the full band strip 88F are not less than two in number, so as to also suppress cord touch, that is, contact between the band cords 84F of the full band 80 and the belt cords 72B of the inner belt ply 92, which may occur if the band strip includes a single band cord.

The tire 2 can prevent contact between the band cords 84 and the belt cords 72 as well as can suppress outer radial growth due to running. The tire 2 can be improved in uneven wear resistance and durability.

The tire 2 does not need any rubber sheet disposed between the full band 80 and the inner belt ply 92 in order to prevent cord touch. The tire 2 can suppress deterioration in productivity as well as can be improved in uneven wear resistance and durability. In view of this, the band cords 84F included in the full band strip 88F are more preferably three in number.

As shown in FIG. 2A, the inner belt ply 92 has an end 92e positioned axially outside the end 80e of the full band 80. The outer belt ply 94 has an end 94e positioned axially inside the end 92e of the inner belt ply 92. The outer belt ply 94 has the end 94e also positioned axially outside the end 80e of the full band 80. The inner belt ply 92 and the outer belt ply 94 each have an axial width larger than the axial width WF of the full band 80 positioned between the inner belt ply 92 and the outer belt ply 94. The full band 80 has the end 80e positioned axially inside the end 94e of the outer belt ply 94.

The inner belt ply 92 and the outer belt ply 94 can effectively suppress force applied to the full band 80. The full band 80 can stably exhibit its function because tension generated at the band cords 84F of the full band 80 is suppressed to have smaller variation. In view of this, the axial width of each of the inner belt ply 92 and the outer belt ply 94 is preferably larger than the axial width WF of the full band 80 positioned between the inner belt ply 92 and the outer belt ply 94. A ratio WF/W3 of the axial width WF of the full band 80 to the axial width of the outer belt ply 94, that is, the axial width W3 of the third belt ply 70C, is preferably not less than 0.80 and not greater than 0.90.

As described above, the inner belt ply 92 corresponds to the second belt ply 70B having the largest axial width among the belt plies 70 forming the belt 66. In view of improvement in uneven wear resistance, when the belt 66 is composed of a plurality of belt plies 70 aligned radially, the belt ply 70 having the larges axial width preferably corresponds to the inner belt ply 92 among the plurality of belt plies 70 forming the belt 66. The end 92e of the inner belt ply 92 corresponds to the end 66e of the belt 66.

As described above, the band 68 of the tire 2 can include the pair of edge bands 82 in addition to the full band 80.

As shown in FIG. 2A, the edge band 82 is disposed radially outside the full band 80. The edge band 82 has an inner end 82ue positioned axially inside the end 80e of the full band 80. The edge band 82 has an outer end 82se positioned axially outside the end 80e of the full band 80. The edge band 82 is radially overlapped with the end 80e of the full band 80. In other words, the edge band 82 is positioned radially outside the end 80e of the full band 80.

The edge band 82 of the tire 2 reinforces a portion including the end 80e of the full band 80. The tire 2 effectively restrains movement of a shoulder portion. The tire 2 can be improved in uneven wear resistance and durability because of suppressed outer radial growth. In view of this, the band 68 of the tire 2 preferably includes the pair of edge bands 82 each positioned radially outside the end 80e of the full band 80.

Each of the edge bands 82 is positioned radially outside the outer belt ply 94. The edge band 82 and the full band 80 interpose the outer belt ply 94. The inner belt ply 92 and the outer belt ply 94 thus interpose the full band 80 such that the edge band 82 further restrains the end 80e of the full band 80 restrained in movement. The tension generated at the band cords 84F of the full band 80 is further suppressed to have smaller variation, so that the full band 80 can more stably exhibit its function. In view of this, each of the edge bands 82 is preferably positioned radially outside the outer belt ply 94. In this case, the edge band 82 is more preferably stacked on the outer belt ply 94 as shown in FIG. 2A.

The band cords 84E included in the edge band strip 88E of the tire 2 are preferably not less than two and not greater than five in number.

When the band cords 84E included in the edge band strip 88E are set to be not greater than five in number, the band cords 84E can effectively restrain movement of the tread portion T intended to expand outward due to the internal pressure and the centrifugal force of the tire 2 in comparison to a case where the edge band strip is a cord array including nine or ten arrayed band cords. The edge band 82 obtained by spirally winding the edge band strip 88E can effectively contribute to suppression of outer radial growth. In view of this, the band cords 84E included in the edge band strip 88E are more preferably not greater than four in number.

The band cords 84E included in the edge band strip 88E are set to be not less than two in number, so as to suppress cord touch, that is, contact between the band cord 84E of the edge band 82 and the belt cord 72C of the outer belt ply 94, which may occur if the band strip includes a single band cord.

The tire 2 does not need any rubber sheet disposed between the full band 80 and the inner belt ply 92 or any rubber sheet disposed between the edge band 82 and the outer belt ply 94 in order to prevent cord touch. The tire 2 can suppress deterioration in productivity as well as can be improved in uneven wear resistance and durability. In view of this, the band cords 84E included in the edge band strip 88E are further preferably three in number. Particularly preferably, the full band strip 88F includes three band cords 84F and the edge band strip 88E includes three band cords 84E.

In FIG. 1, a solid line NL is a normal line of the carcass 12 passing through the end TE of the tread surface 26. A length indicated by a double pointed arrow E is a thickness of the tire 2 measured along the normal line NL. As shown in FIG. 1, the normal line NL crosses the base portion 28. A length indicated by a double pointed arrow B is a thickness of the base portion 28 measured along the normal line NL.

As described above, the tread 4 of the tire 2 includes base portion 28 and the cap portion 30. The base portion 28 is formed from a low-heat-generating crosslinked rubber, and the cap portion 30 is formed from a crosslinked rubber having wear resistance. The base portion 28 can contribute to reduction in rolling resistance of the tire 2, but is worse in physical properties than the cap portion 30. Accordingly, the base portion 28 included in the tread 4 is preferably smaller in amount in order for improvements in uneven wear resistance and durability of the tire 2.

As described above, the band cords included in the full band strip 88F of the tire 2 are not greater than five in number. The full band 80 can thus contribute more effectively to restraining movement of the tire 2 in comparison to a full band including a conventional band strip. The tire 2 can thus keep low rolling resistance even if the base portion 28 is reduced in amount. Reduction in the amount of the base portion 28 can contribute to improvements in uneven wear resistance and durability. In order to improve uneven wear resistance and durability, on the normal line NL of the carcass 12 passing through the end TE of the tread surface 26, a ratio B/E of the thickness B of the base portion 28 to the thickness E of the tire 2 is preferably not greater than 1/3 and more preferably not greater than 1/5. In order to keep low rolling resistance, the ratio B/E is preferably not less than 1/10. In this case, the tire 2 can keep low rolling resistance as well as can be improved in uneven wear resistance and durability.

As shown in FIG. 1, the end 24*e* of the reinforcing layer 24 is positioned axially inside the normal line NL. The end 24*e* of the reinforcing layer 24 is positioned appropriately so as to cover the end 24*e* of the reinforcing layer 24 with the tread 4 having a sufficient amount. The tire 2 effectively suppresses damage such as belt edge loose. The tire 2 can be improved in durability. In view of this, the end 24*e* of the reinforcing layer 24 is preferably positioned axially inside the normal line NL.

In FIG. 2B, a length indicated by a double-pointed arrow FU is a distance between the full band 80 and the inner belt ply 92. The distance FU is represented as a distance between the band cord 84F of the full band 80 closest to the end 80*e* of the full band 80 and the belt cord 72B of the inner belt ply 92 closest to the band cord 84F.

A length indicated by a double-pointed arrow ES is a distance between the edge band 82 and the outer belt ply 94. The distance ES is represented as a distance between the belt cord 72C of the outer belt ply 94 closest to the end 80*e* of the full band 80 and the band cord 84E of the edge band 82 closest to the belt cord 72C.

The distance FU and the distance ES are both cord-to-cord distances. Each of the distances corresponds to a thickness of a rubber component positioned between the band cord 84 and the belt cord 72. The rubber component relevant to the distance FU includes the topping rubber 86 of the full band 80 and the topping rubber 74 of the inner belt ply 92. The rubber component relevant to the distance ES includes the topping rubber 86 of the edge band 82 and the topping rubber 74 of the outer belt ply 94.

The distance FU between the full band 80 and the inner belt ply 92 is preferably not less than 0.6 mm at the end 80*e* of the full band 80. This effectively suppresses cord touch, that is, contact between the band cord 84F of the full band 80 and the belt cord 72B of the inner belt ply 92. If the band cord 84F and the belt cord 72B interpose a rubber component having a large amount, repetitive deformation may cause heat generation to eventually increase rolling resistance of the tire 2. In order to suppress an increase in rolling resistance, the distance FU is preferably not greater than 2.0 mm.

The distance ES between the edge band 82 and the outer belt ply 94 is preferably not less than 0.6 mm at the end 80*e* of the full band 80. This effectively suppresses cord touch, that is, contact between the band cord 84E of the edge band 82 and the belt cord 72C of the outer belt ply 94. If the band cord 84E and the belt cord 72C interpose a rubber component having a large amount, repetitive deformation may cause heat generation to eventually increase rolling resistance of the tire 2. In order to suppress an increase in rolling resistance, the distance ES is preferably not greater than 2.0 mm.

In FIG. 2A, a solid line LE is a straight line (hereinafter, inner end reference line) passing through the inner end 82*ue* of the edge band 82 and extending radially. A position indicated by a reference sign PE is a point of intersection between the inner end reference line LE and the tread surface 26. The point of intersection PE is a position (hereinafter, inner end corresponding position) on the tread surface 26 corresponding to the inner end 82*ue* of the edge band 82. A length indicated by a double-pointed arrow GE is a length from the shoulder circumferential groove 36 to the inner end corresponding position PE. The length GE is represented as a length measured along the tread surface 26, between an edge 36E of the shoulder circumferential groove 36 adjacent to the end TE of the tread surface 26 and the inner end corresponding position PE.

A length indicated by a double-pointed arrow WGCs is a groove width at a groove opening 36M of the shoulder circumferential groove 36.

As described above, the edge band 82 of the tire 2 is positioned axially between the shoulder circumferential groove 36 and the end 66*e* of the belt 66. In other words, the edge band 82 is positioned in the shoulder land portion 42.

If the edge band 82 is positioned close to the shoulder circumferential groove 36, a groove wall 36W of the shoulder circumferential groove 36 may be strained unusually even though the edge band 82 restrains movement of the shoulder portion. When the groove wall 36W is strained excessively, the circumferential groove 36 may have damage such as a crack in a wall surface 36S or a bottom surface 36B. In view of this, the length GE from the shoulder circumferential groove 36 to the inner end corresponding position PE of the edge band 82 is controlled in the tire 2.

In the tire 2, the length GE from the shoulder circumferential groove 36 to the inner end corresponding position PE is smaller than the groove width WGCs of the shoulder circumferential groove 36. Specifically, a ratio GE/WGCs of the length GE from the shoulder circumferential groove 36 to the inner end corresponding position PE of the edge band 82 to the groove width WGCs of the shoulder circumferential groove 36 is preferably not less than 0.30 and not greater than 0.50.

The ratio GE/WGCs set to be not less than 0.30 allows the edge band 82 to be disposed to be appropriately distant from the shoulder circumferential groove 36. The tire 2 can suppress damage to the shoulder circumferential groove 36 caused by the edge band 82.

When the ratio GE/WGCs is set to be not greater than 0.50, the edge band 82 can effectively contribute to suppression of outer radial growth due to running.

The center circumferential grooves 38 of the tire 2 each have a bottom surface 38B including a groove bottom 38T and being curved. FIG. 2A shows a section of the center circumferential groove 38 in which the bottom surface 38B has a contour indicated by an arc. FIG. 2A includes arrow Rc indicating a radius of the arc as the contour of the bottom surface 38B. The bottom surface 36B including a groove bottom 36T of the shoulder circumferential groove 36 is also curved. FIG. 2A shows a section of the shoulder circumferential groove 36 in which the bottom surface 36B has a contour indicated by an arc. FIG. 2A includes arrow Rs indicating a radius of the arc as the contour of the bottom surface 36B.

The radius Rc of the arc indicating the contour of the bottom surface 38B of the center circumferential groove 38 is preferably not less than 2.5 mm. This suppresses unusual strain at the bottom surface 38B of the center circumferential groove 38. The tire 2 can thus keep excellent durability. In view of this, the radius Rc is more preferably not less than 3.0 mm.

The radius Rs of the arc indicating the contour of the bottom surface 36B of the shoulder circumferential groove 36 is preferably not less than 2.5 mm. This suppresses unusual strain at the bottom surface 36B of the shoulder circumferential groove 36. The tire 2 can thus keep excellent durability. In view of this, the radius Rs is more preferably not less than 3.0 mm.

When the radius Rs of the arc indicating the contour of the bottom surface 36B of the shoulder circumferential groove 36 is not less than 2.5 mm in the tire 2, the groove width WGCs at the groove opening 36M of the shoulder circumferential groove 36 is preferably not less than 4% and not greater than 9% of the width WT of the tread surface 26.

The groove width WGCs set to be not less than 4% of the width WT suppresses unusual strain at the shoulder circumferential groove 36. The tire 2 can thus keep excellent durability.

When the groove width WGCs is set to be not greater than 9% of the width WT, the shoulder circumferential groove 36 is appropriately kept in size to suppress influences of the shoulder circumferential groove 36 on stiffness of the tread portion T. The tire 2 can effectively suppress outer radial growth due to running.

In FIG. 2C, a length indicated by a double-pointed arrow SU is a distance between the outer belt ply 94 and the inner belt ply 92. The distance SU is represented as a distance between the belt cord 72C of the outer belt ply 94 closest to the end 94e of the outer belt ply 94 and the belt cord 72B of the inner belt ply 92 closest to the belt cord 72C.

The distance SU is a cord-to-cord distance. The distance SU corresponds to a thickness of a rubber component positioned between the belt cord 72C and the belt cord 72B at the end 94e of the outer belt ply 94. The rubber component relevant to the distance SU includes the topping rubber 74 of the outer belt ply 94, the edge member 78, and the topping rubber 74 of the inner belt ply 92.

The distance SU between the outer belt ply 94 and the inner belt ply 92 is preferably not less than 3.0 mm at the end 94e of the outer belt ply 94.

The shoulder portion tends to have outer radial growth due to running, and a portion around the end 66e of the belt 66 tends to be strained unusually. Excessive strain may cause damage such as belt edge loose. However, the distance SU set to be not less than 3.0 mm effectively suppresses strain. The tire 2 can thus keep excellent durability.

If the belt cord 72C and the belt cord 72B interpose a rubber component having a large amount, repetitive deformation may cause heat generation to eventually increase rolling resistance of the tire 2. In order to suppress an increase in rolling resistance, the distance SU is preferably not greater than 4.5 mm.

As apparent from the above description, the present disclosure can provide heavy duty tires 2 that can be improved in uneven wear resistance and durability.

Among the heavy duty tires, a low profile tires is larger in an internal pressure share ratio of a tread than a high profile tire and tends to have outer radial growth at a shoulder portion. The shoulder portion tends to be increased in ground contact pressure and damage such as belt edge loose may be caused in an end portion of a belt.

A tire to be mounted on a trailer axle receives larger axial force than a tire to be mounted on any other axle. The shoulder portion may thus be strained unusually and damage such as belt edge loose may be caused in the end portion of the belt.

As described above, the present disclosure suppresses outer radial growth due to running and suppresses strain due to the outer radial growth. That is, if the present disclosure is applied to a low profile tire to be mounted on a trailer axle, damage to the tire can be suppressed effectively. The present disclosure exhibits significant effects on a low profile tire to be mounted on a trailer axle.

EXAMPLES

The following will describe the present disclosure in more detail by means of examples and the like, although the present disclosure is not limited to these examples.

Examples 1 to 4 and Comparative Examples 1 to 3

A heavy duty pneumatic tire (tire size: 355/50R22.5) is obtained to have the basic configuration shown in FIG. 1 and have specifications indicated in Table 1 provided below.

Same band strips are applied as a full band strip and an edge band strip. Tires according to Examples 1 to 4 and Comparative Examples 1 to 3 were obtained by changing the number of band cords included in the band strip as indicated in Table 1.

[Outer Radial Suppression]

Each experimental tire was fitted on a rim (size: 11.75× 22.5), and was filled with air to adjust internal pressure of the tire to the normal internal pressure. The tire was set in a drum test machine to run 1000 km at the speed of 80 km/h to obtain a profile of a case line inside a shoulder circumferential groove. The profile of the case line was compared with a profile of a case line before running to check changes between the profile before running and the profile after running. Table 1 indicates results thereof as indices assuming variation according to Comparative Example 2 as 100. A larger numerical value indicates more suppressed outer radial growth.

[Cord Touch]

Each experimental tire was fitted on a rim (size: 11.75× 22.5), and was filled with air to adjust internal pressure of the tire to the normal internal pressure. The tire was set in a drum test machine to run at the speed of 80 km/h. The distance FU between a full band and an inner belt ply was measured after the tire ran 1000 km. Table 1 indicates results thereof as indices assuming the distance FU according to Comparative Example 2 as 100. A larger numerical value indicates more suppressed cord touch.

[Productivity]

Measured was time necessary to form a band. Table 1 indicates results thereof as indices assuming formation time according to Comparative Example 2 as 100. A larger numerical value indicates shorter formation time with more excellent productivity.

[Comprehensive Evaluation]

The indices obtained in the respective evaluations were totalized. Table 1 indicates results thereof as comprehensive evaluation. A larger numerical value is preferred.

TABLE 1

| | Comp. Example 1 | Example 1 | Example 2 | Example 3 | Example 4 | Comp. Example 2 | Comp. Example 3 |
|---|---|---|---|---|---|---|---|
| Number of band cords [Number] | 1 | 2 | 3 | 4 | 5 | 9 | 6 |
| Outer radial suppression index | 225 | 200 | 175 | 150 | 125 | 100 | 110 |

TABLE 1-continued

| | Comp. Example 1 | Example 1 | Example 2 | Example 3 | Example 4 | Comp. Example 2 | Comp. Example 3 |
|---|---|---|---|---|---|---|---|
| Cord touch index | 50 | 100 | 100 | 100 | 100 | 100 | 100 |
| Productivity index | 20 | 40 | 80 | 80 | 100 | 100 | 100 |
| Comprehensive evaluation | 295 | 340 | 355 | 330 | 325 | 300 | 310 |

As indicated in Table 1, outer radial suppression and cord touch are adjusted to be well balanced and excellent productivity is achieved in each example. The comprehensive evaluation clarifies superiority of the present disclosure.

INDUSTRIAL APPLICABILITY

The above technique achieving improvements in uneven wear resistance and durability is applicable to various types of tires.

REFERENCE SIGNS LIST 2 tire
4 tread
10 bead
12 carcass
24 reinforcing layer
26 tread surface
28 base portion
30 cap portion
56 carcass ply
58 ply body
60 turned-up portion
62 carcass cord
64 topping rubber of carcass 12
66 belt
68 band
70, 92, 94 belt ply
72 belt cord
74 topping rubber of belt 66
78 edge member
80 full band
82 edge band
84, 84F, 84E band cord
86 topping rubber of band 68
88, 88F, 88E band strip

What is claimed is:

1. A heavy duty tire comprising a pair of beads, a carcass extending between the pair of beads, a tread positioned radially outside the carcass and having a tread surface configured to come into contact with a road surface, and a reinforcing layer positioned radially between the carcass and the tread, wherein the reinforcing layer includes a belt including a large number of belt cords arranged parallelly, and a band including a band cord spirally wound, the belt includes an inner belt ply and an outer belt ply aligned radially, an inclination direction of the belt cords included in the inner belt ply is opposite to an inclination direction of the belt cords included in the outer belt ply, the band includes a full band obtained by spirally winding a full band strip, the full band is positioned between the inner belt ply and the outer belt ply, the full band strip includes a cord array in which a plurality of the band cords are arranged, the band cords included in the full band strip are not less than two and not greater than five in number, a ratio of an axial width of the full band to a width of the tread surface is not less than 0.70 and not greater than 0.80, and in the full band strip, the band cords are adjacent to each other at an interval not less than 0.5 mm and not greater than 2.0 mm.

2. The heavy duty tire according to claim 1, wherein the outer belt ply has an end positioned axially outside an end of the full band.

3. The heavy duty tire according to claim 1, wherein the band cords included in the full band strip are three in number.

4. The heavy duty tire according to claim 1, wherein at an end of the full band, a distance between the full band and the inner belt ply is not greater than 2.0 mm.

5. The heavy duty tire according to claim 1, wherein at an end of the outer belt ply, a distance between the outer belt ply and the inner belt ply is not less than 3.0 mm.

6. The heavy duty tire according to claim 1, wherein the tread includes a base portion positioned radially outside the reinforcing layer, and a cap portion positioned radially outside the base portion and having the tread surface, and on a normal line of the carcass passing through an end of the tread surface, a ratio of a thickness of the base portion to a thickness of the tire is not greater than 1/3.

7. The heavy duty tire according to claim 6, wherein the ratio of the thickness of the base portion to the thickness of the tire is not greater than 1/5.

8. The heavy duty tire according to claim 6, wherein an end of the reinforcing layer is positioned axially inside the normal line of the carcass.

9. The heavy duty tire according to claim 6, wherein an end of the base portion is positioned axially outside the normal line of the carcass, and an inner end of the cap portion is positioned radially inside an inner end of the base portion.

10. The heavy duty tire according to claim 1, wherein the band further includes a pair of edge bands each obtained by spirally winding an edge band strip, the edge band strip includes a cord array in which a plurality of the band cords are arranged, and the pair of edge bands is positioned radially outside ends of the full band, respectively.

11. The heavy duty tire according to claim 10, wherein in the edge band strip, the band cords are adjacent to each other at an interval not less than 0.5 mm and not greater than 2.0 mm.

12. The heavy duty tire according to claim 10, wherein at an end of the full band, a distance between the edge band and the outer belt ply is not greater than 2.0 mm.

13. The heavy duty tire according to claim 10, wherein the band cords included in the edge band strip are not less than two and not greater than five in number.

14. The heavy duty tire according to claim 13, wherein the band cords included in the edge band strip are three in number.

15. The heavy duty tire according to claim 10, wherein the tread includes a plurality of circumferential grooves continuously extending in the circumferential direction, among the plurality of circumferential grooves, a circumferential groove located axially outermost is a shoulder circumferential groove, the edge band is positioned axially between the shoulder circumferential groove and an end of the belt, a position on the tread surface corresponding to an inner end of the edge band is an inner end corresponding position, and a length from the shoulder circumferential groove to the inner end corresponding position is smaller than a groove width of the shoulder circumferential groove.

16. The heavy duty tire according to claim 15, wherein a ratio of the length from the shoulder circumferential groove to the inner end corresponding position to the groove width of the shoulder circumferential groove is not less than 0.30 and not greater than 0.50.

* * * * *